US011936471B2

(12) United States Patent
Yue et al.

(10) Patent No.: US 11,936,471 B2
(45) Date of Patent: Mar. 19, 2024

(54) HIGH-DIMENSIONAL NON-ORTHOGONAL TRANSMISSION METHOD

(71) Applicant: University of Electronic Science and Technology of China, Chengdu (CN)

(72) Inventors: Guangrong Yue, Chengdu (CN); Daizhong Yu, Chengdu (CN); Lin Yang, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 18/033,372

(22) PCT Filed: Apr. 29, 2021

(86) PCT No.: PCT/CN2021/090967
§ 371 (c)(1),
(2) Date: Apr. 24, 2023

(87) PCT Pub. No.: WO2022/100027
PCT Pub. Date: May 19, 2022

(65) Prior Publication Data
US 2023/0403097 A1    Dec. 14, 2023

(30) Foreign Application Priority Data
Nov. 11, 2020   (CN) .......................... 202011249750.4

(51) Int. Cl.
*H04L 1/00* (2006.01)
*H04B 17/336* (2015.01)

(52) U.S. Cl.
CPC ........ *H04L 1/0009* (2013.01); *H04B 17/336* (2015.01)

(58) Field of Classification Search
CPC .......................... H04L 1/0009; H04B 17/336
See application file for complete search history.

(56) References Cited

U.S. PATENT DOCUMENTS

2017/0126294 A1*  5/2017  Wernersson .......... H04L 5/0048
2017/0288710 A1* 10/2017  Delfeld ................. H04L 5/0048
(Continued)

FOREIGN PATENT DOCUMENTS

CN    110365377 A  * 10/2019   ........... H04B 7/0413
CN    110365377 A    10/2019
(Continued)

*Primary Examiner* — Guy J Lamarre
*Assistant Examiner* — Enamul M Kabir
(74) *Attorney, Agent, or Firm* — Bayramoglu Law Offices LLC

(57) ABSTRACT

A high-dimensional non-orthogonal transmission method is provided. In the method, signals of various users are mapped to form high-dimensional signals, and the high-dimensional signals are pre-coded, such that non-orthogonal transmission is realized in a higher dimension. Moreover, different users perform matched receiving on respective signals, and non-orthogonal transmission signals can be recovered merely by means of a receiver with a linear complexity. By means of the method, multi-user data non-orthogonal transmission can be realized without depending on conditions such as user pairing and collaboration, and various users do not need to perform iterative feedback, such that the detection complexity of non-orthogonal multi-user signals is significantly reduced.

2 Claims, 2 Drawing Sheets

(56) References Cited

U.S. PATENT DOCUMENTS

| | | | |
|---|---|---|---|
| 2018/0241446 A1* | 8/2018 | Fakoorian | H04B 7/022 |
| 2018/0269935 A1* | 9/2018 | Wang | H04B 7/0426 |
| 2019/0341981 A1* | 11/2019 | Park | H04B 7/0479 |
| 2021/0105155 A1* | 4/2021 | Kons | H04L 25/0248 |
| 2022/0352933 A1* | 11/2022 | Rakib | H04L 5/0023 |

FOREIGN PATENT DOCUMENTS

| | | | | |
|---|---|---|---|---|
| CN | 112019464 A | 12/2020 | | |
| CN | 112073156 A | 12/2020 | | |
| CN | 112104582 A | 12/2020 | | |
| EP | 1737176 A1 * | 12/2006 | | H04B 7/0452 |

* cited by examiner

HIGH-DIMENSIONAL NON-ORTHOGONAL TRANSMISSION METHOD

CROSS REFERENCE TO THE RELATED APPLICATIONS

This application is the national phase entry of International Application No. PCT/CN2021/090967, filed on Apr. 29, 2021, which is based upon and claims priority to Chinese Patent Application No. 202011249750.4, filed on Nov. 11, 2020, the entire contents of which are incorporated herein by reference.

TECHNICAL FIELD

The present invention belongs to the field of telecommunications, and in particular, relates to a high-dimensional non-orthogonal transmission method.

BACKGROUND

In the past few years, non-orthogonal multiple access (NOMA) has attracted much attention as a candidate technology for LTE, 5G and beyond 5G. In NOMA, multiple pieces of user equipment (UE) realizes collaboration and share time domain, frequency domain and code domain channel resources. 3GPP considered different applications of NOMA. Academia and industry have also proposed various SCMA system, such as power domain NOMA, sparse code multiple access (SCMA), modular division multiple access (PDMA), resource extended multiple access (RSMA) and the like. Through reasonable configuration, NOMA can obtain higher user capacity than orthogonal multiple access (OMA). However, the core challenges of the existing NOMA technology lie in the need for higher receiver complexity, user pairing and user collaboration complexity, and the detection complexity increases rapidly as the number of UE increases.

SUMMARY

To solve the above problem, the present invention provides a high-dimensional non-orthogonal transmission method. Multi-user data non-orthogonal transmission can be realized without depending on conditions of user pairing and collaboration, various users do not need to perform iterative feedback, and data can be recovered only through common coherent reception, such that the signal detection complexity is significantly reduced.

The present invention discloses a high-dimensional non-orthogonal transmission method. In the method, a transmitter, a plurality of users and a plurality of channel resources are provided; the transmitter is configured to process and transmit original signals of the plurality of users; the plurality of users receive and recover respective original signals; and the plurality of channel resources include the time-domain, the frequency-domain, and the space-domain resources, for the transmitter and the plurality of users to use.

The high-dimensional non-orthogonal transmission method includes the following steps:

step 1: mapping, by the transmitter, an original signal of a $u^{th}$ user to a $u^{th}$ high-dimensional original signal, where the $u^{th}$ high-dimensional original signal is as follows:

$$s(u) = \begin{bmatrix} s_1(u) \\ s_2(u) \\ \vdots \\ s_M(u) \end{bmatrix}, s_1(u) = s_2(u) = \cdots = s_M(u) = \frac{s_0(u)}{\sqrt{M}}$$

where $s_0(u)$ represents the original signal of the $u^{th}$ user, $s(u)$ represents the $u^{th}$ high-dimensional original signal, $s_1(u)$ represents the $i^{th}$ dimension of the $u^{th}$ high-dimensional original signal, $i=1, 2, \ldots, M$, and M represents the dimension of the $u^{th}$ high-dimensional original signal and has a value equal to the number of the channel resources;

step 2: precoding, by the transmitter, the $u^{th}$ high-dimensional original signal to generate a $u^{th}$ high-dimensional transmission signal, where the precoding is as follows:

$$x(u) = \begin{bmatrix} x_1(u) \\ x_2(u) \\ \vdots \\ x_M(u) \end{bmatrix} = \begin{bmatrix} s_1(u)\alpha_1(u) \\ s_2(u)\alpha_2(u) \\ \vdots \\ s_M(u)\alpha_M(u) \end{bmatrix}$$

where $x(u)$ represents the $u^{th}$ high-dimensional transmission signal, $x_i(u)$ represents the $i^{th}$ dimension of the $u^{th}$ high-dimensional transmission signal, and $\alpha_i(u)$ represents the $i^{th}$ dimension of a $u^{th}$ precoding signal;

step 3: summing up, by the transmitter, all $u^{th}$ high-dimensional transmission signals to obtain a total high-dimensional transmission signal:

$$\tilde{x} = \sum_{u=1}^{U} x(u)$$

where U represents the number of the users, and $\tilde{x}$ represents the total high-dimensional transmission signal; broadcasting, by the transmitter, the total high-dimensional transmission signal to all the users using the plurality of channel resources, where one of the plurality of channel resources is used to transmit one dimension of the total high-dimensional transmission signal; and step 4: receiving, by the $u^{th}$ user, the total high-dimensional transmission signal to obtain a total high-dimensional received signal, and performing matched receiving on the total high-dimensional received signal according to the $u^{th}$ precoding signal to obtain an estimation of the $u^{th}$ original signal, where $u=1, 2, \ldots, U$, and a matched receiving process is as follows:

$$\hat{\tilde{x}} = \begin{bmatrix} \hat{\tilde{x}}_1 \\ \hat{\tilde{x}}_2 \\ \vdots \\ \hat{\tilde{x}}_M \end{bmatrix}$$

$$\hat{s}_0(u) = \sum_{i=1}^{M} \alpha_i^*(u)\hat{\tilde{x}}_i$$

where $\hat{s}_0(u)$ represents an estimation of the $u^{th}$ original signal, $\alpha_i^*(u)$ represents conjugation of the $i^{th}$ dimension of the $u^{th}$ precoding signal, $\hat{\tilde{x}}$ represents the total high-dimensional received signal, $\hat{\tilde{x}}_i$ represents the $i^{th}$ dimension of the total high-dimensional received signal, and $i=1, 2, \ldots, M$.

Further, the $i^{th}$ dimension of the $u^{th}$ precoding signal in step 2 is as follows:

$$\alpha_i(u) = \prod_{k=1}^{L} \exp\left(\frac{j2\pi(m_k-1)\Delta f_k(u-1)T}{U}\right)$$

then the $u^{th}$ precoding signal is as follows:

$$\alpha(u) = \begin{bmatrix} \alpha_1(u) \\ \alpha_2(u) \\ \vdots \\ \alpha_M(u) \end{bmatrix}$$

where J represents an imaginary unit, L represents the number of precoding layers, $m_k$ represents a $k^{th}$ layer of precoding branch indexes, and the number k of the precoding layers and the $k^{th}$ layer of precoding branch indexes m k satisfy:

$$1 \le m_k \le M_k$$

$$m_L + \sum_{k=1}^{L-1}\left[(m_k-1)\prod_{l=k+1}^{L} M_l\right] = i$$

$$\prod_{k=1}^{L} M_k = M$$

where $M_k$ represents the number of the $k^{th}$ layer of precoding branches, $\Delta f_k$ represents the let layer of frequency offsets and has a value determined in advance, k=1, 2, . . . L, T represents an offset period and has a value as follows:

$$T = \frac{1}{gcd(\Delta f_1, \Delta f_2, \cdots, \Delta f_L)}$$

$gcd(\Delta f_1, \Delta f_2, \ldots, \Delta f_L)$ represents the greatest common divisor of $\Delta f_1, \Delta f_2, \ldots, \Delta f_L$.

In the present invention, signals of a plurality of users are mapped to form high-dimensional signals, and the high-dimensional signals are pre-coded, such that non-orthogonal transmission is realized in a higher dimension. Moreover, different users perform matched receiving on respective signals, and non-orthogonal transmission signals can be recovered with a receiver with merely a linear complexity. Furthermore, by means of the method disclosed in the present invention, multi-user data non-orthogonal transmission can be realized without depending on methods such as user pairing and collaboration, and the users do not need to perform iterative feedback, such that the detection complexity of non-orthogonal multi-user signals is significantly reduced.

DETAILED DESCRIPTION OF THE EMBODIMENTS

Figure 1:
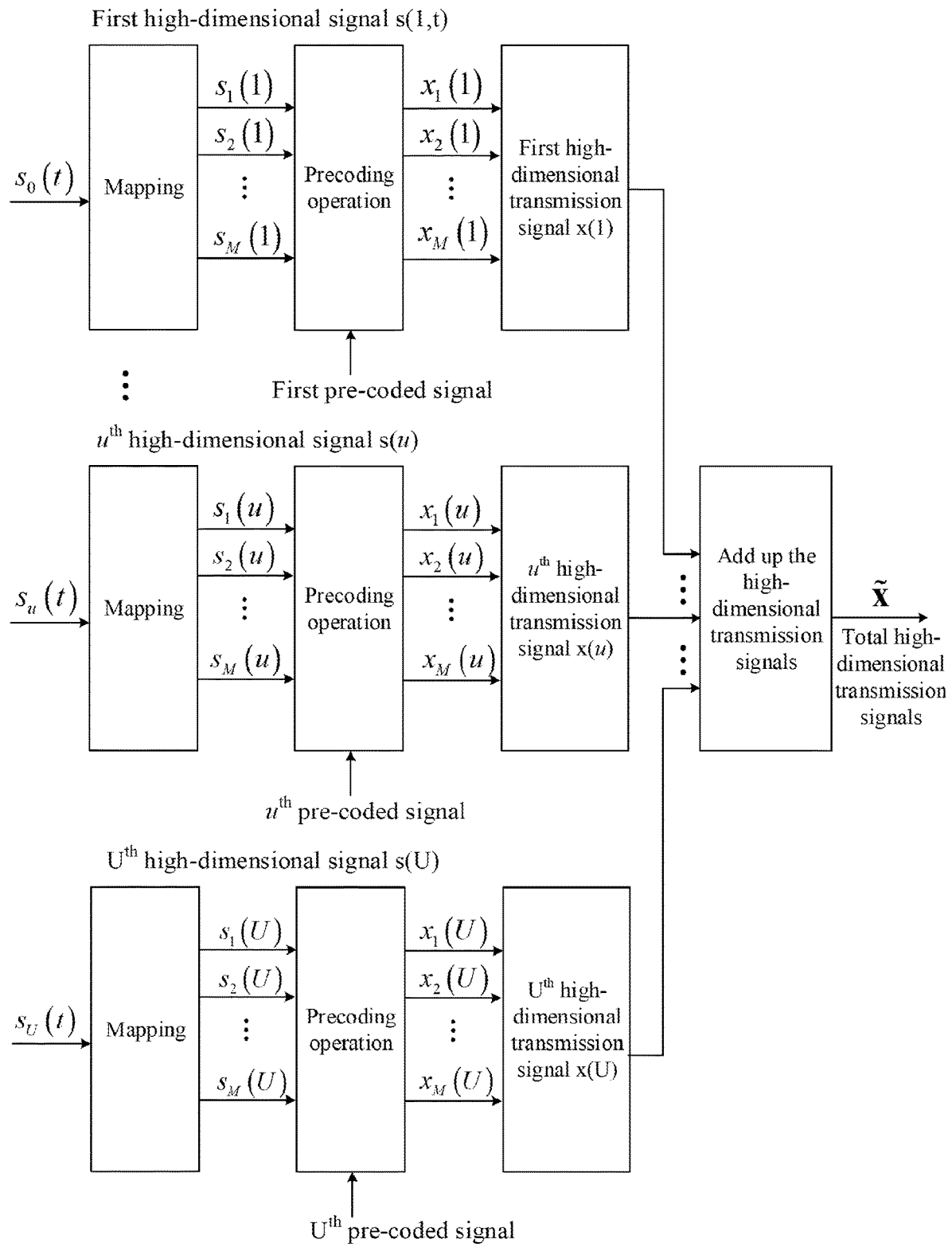
FIG. 1 is a structural block diagram of a transmitter.

A specific embodiment of the present invention will be given below. In this embodiment, it is assumed that the number of users is: U=80 and the number of channel resources is 64, where the channel resources here specifically refer to frequency-domain subcarriers. The number of precoding layers is: L=2, the number of the first layer of precoding branches is: $M_1$=8, the number of the second layer of precoding branches is: $M_2$=8, the first layer of frequency offsets is: $\Delta f_1$=100 kHz, and the second layer of frequency offsets is: $\Delta f_2$=200 kHz. A transmitter transmits signals according to the following steps:

The transmitter adopts a system structure shown in FIG. 1. Firstly, an original signal of a $u^{th}$ user is mapped to form a $u^{th}$ high-dimensional original signal, where the $u^{th}$ high-dimensional original signal is as follows:

$$s(u) = \begin{bmatrix} s_1(u) \\ s_2(u) \\ \vdots \\ s_{64}(u) \end{bmatrix}, s_1(u) = s_2(u) = \cdots = s_{64}(u) = \frac{s_0(u)}{\sqrt{64}}$$

The transmitter precodes the $u^{th}$ high-dimensional original signal to generate a $u^{th}$ high-dimensional transmission signal. A precoding process is as follows:

$$x(u) = \begin{bmatrix} x_1(u) \\ x_2(u) \\ \vdots \\ x_{64}(u) \end{bmatrix} = \begin{bmatrix} s_1(u)\alpha_1(u) \\ s_2(u)\alpha_2(u) \\ \vdots \\ s_{64}(u)\alpha_{64}(u) \end{bmatrix}$$

where x(u) represents the $u^{th}$ high-dimensional transmission signal, the $u^{th}$ precoding signal is generated according to a generation structure shown in FIG. 3, and the $i^{th}$ dimension of the $u^{th}$ precoding signal is as follows:

$$\alpha_i(u) = \exp\left(\frac{j2\pi(m_1-1)\Delta f_1(u-1)T}{80}\right)\exp\left(\frac{j2\pi(m_2-1)\Delta f_2(u-1)T}{80}\right),$$

$$T = 10\mu s \begin{cases} 8(m_1-1) + m_2 = i \\ 0 \le m_1 \le 8 \\ 0 \le m_2 \le 8 \end{cases}$$

Figure 2:
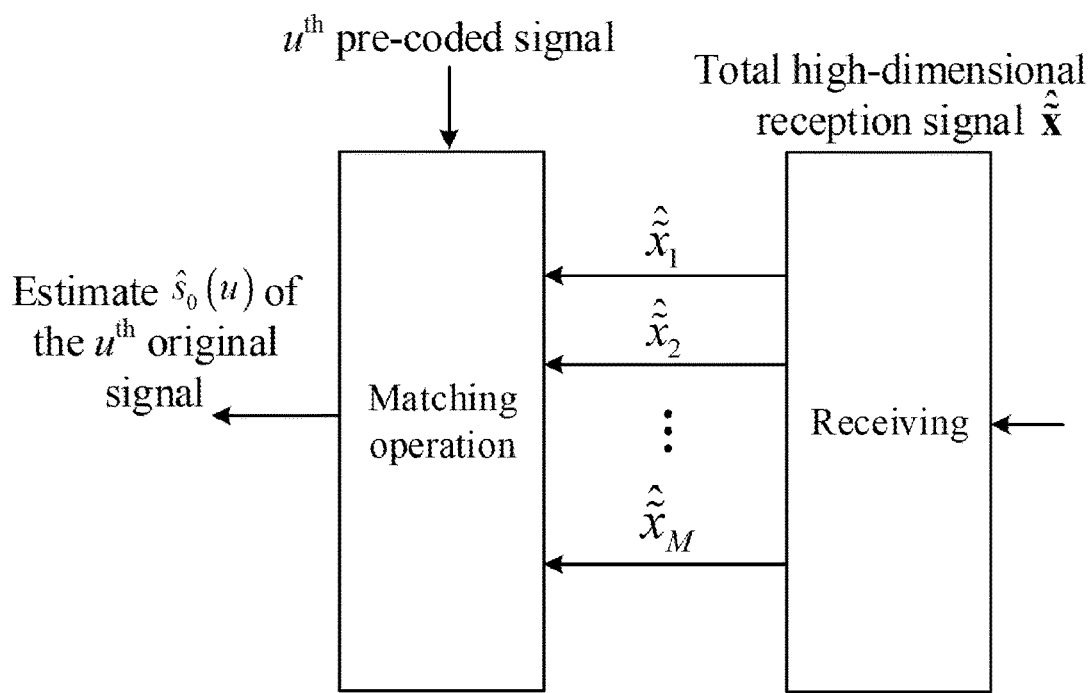
FIG. 2 is a block diagram of a $u^{th}$ user of a plurality of users.

A receiver of the $u^{th}$ user of the plurality of users adopts the block diagram shown in FIG. 2. The transmitter sums up all the $u^{th}$ high-dimensional transmission signals to obtain a total high-dimensional transmission signal:

$$\tilde{x} = \sum_{u=1}^{U} x(u)$$

The $u^{th}$ user of the plurality of users receives the total high-dimensional transmission signal to obtain a total high-dimensional received signal, matched receiving is performed on the total high-dimensional received signal according to the $u^{th}$ precoding signal to obtain an estimation of the $u^{th}$ original signal. A matched receiving process is as follows:

$$\hat{x} = \begin{bmatrix} \hat{x}_1 \\ \hat{x}_2 \\ \vdots \\ \hat{x}_M \end{bmatrix}$$

$$\hat{s}_0(u) = \sum_{i=1}^{M} a_i^*(u)\hat{x}_i$$

where $\hat{s}_0(u)$ represents an estimation for the $u^{th}$ original signal, and $\alpha_i^*(u)$ represents conjugation of the $i^{th}$ dimension of the $u^{th}$ precoding signal and has a value as follows:

$$\alpha_i^*(u) = \exp\left(-\frac{j2\pi(m_1-1)\Delta f_1(u-1)T}{80}\right)\exp\left(-\frac{j2\pi(m_2-1)\Delta f_2(u-1)T}{80}\right),$$

$$T = 10\mu s \begin{cases} 8(m_1-1) + m_2 = i \\ 0 \le m_1 \le 8 \\ 0 \le m_2 \le 8 \end{cases}$$

Figure 3:
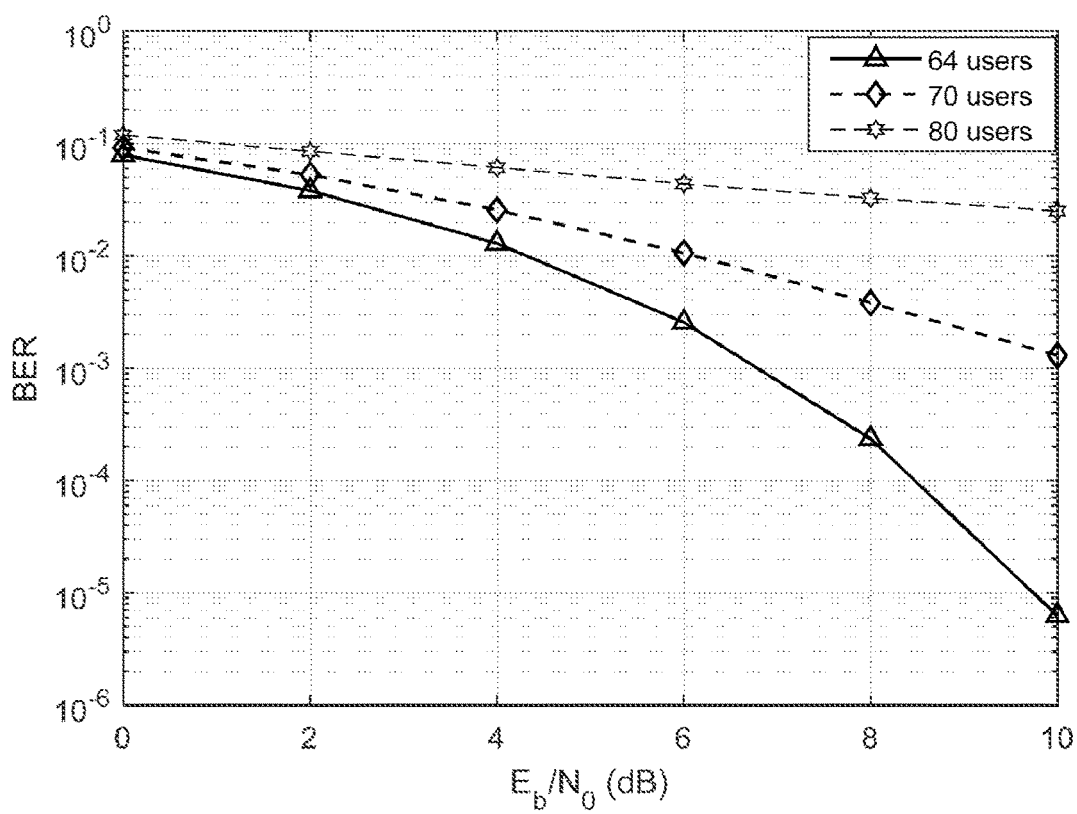
FIG. 3 is a multi-user communication error rate performance curve when 64 channel sources are used.

FIG. 3 is a multi-user communication error rate performance curve when 64 channel sources are used in this embodiment. It can be seen that by adoption of the non-orthogonal transmission method provided by this embodiment, communication with more than 64 users can be realized; furthermore, the detection method provided by this embodiment only needs to perform correlation and addition operations. The detection method does not need user pairing, collaboration and iterative feedback, and only has a linear complexity.

What is claimed is:

1. A high-dimensional non-orthogonal transmission method, wherein in the method, a transmitter, a plurality of users and a plurality of channel resources are provided; the transmitter is configured to process and transmit original signals of the plurality of users; the plurality of users receive and recover respective original signals; the plurality of channel resources comprise a time-domain, a frequency-domain and a space-domain resources, for the transmitter and the plurality of users to use;

the high-dimensional non-orthogonal transmission method comprises the following steps:

step 1: mapping, by the transmitter, an original signal of a $u^{th}$ user to a $u^{th}$ high-dimensional original signal, wherein the $u^{th}$ high-dimensional original signal is as follows:

$$s(u) = \begin{bmatrix} s_1(u) \\ s_2(u) \\ \vdots \\ s_M(u) \end{bmatrix}, s_1(u) = s_2(u) = \cdots = s_M(u) = \frac{s_0(u)}{\sqrt{M}}$$

wherein $s_0(u)$ represents the original signal of the $u^{th}$ user, $s(u)$ represents the $u^{th}$ high-dimensional original signal, $s_1(u)$ represents an $i^{th}$ dimension of the $u^{th}$ high-dimensional original signal, $i=1, 2, \ldots, M$, and M represents a dimension of the $u^{th}$ high-dimensional original signal and has a value equal to a number of the channel resources;

step 2: precoding, by the transmitter, the $u^{th}$ high-dimensional original signal to generate a $u^{th}$ high-dimensional transmission signal, wherein a precoding process is as follows:

$$x(u) = \begin{bmatrix} x_1(u) \\ x_2(u) \\ \vdots \\ x_M(u) \end{bmatrix} = \begin{bmatrix} s_1(u)\alpha_1(u) \\ s_2(u)\alpha_2(u) \\ \vdots \\ s_M(u)\alpha_M(u) \end{bmatrix}$$

wherein $x(u)$ represents the $u^{th}$ high-dimensional transmission signal, $x_i(u)$ represents a $i^{th}$ dimension of the $u^{th}$ high-dimensional transmission signal, and $\alpha_i(u)$ represents a $i^{th}$ dimension of a $u^{th}$ precoding signal;

step 3: summing up, by the transmitter, all $u^{th}$ high-dimensional transmission signals to obtain a total high-dimensional transmission signal:

$$\tilde{x} = \sum_{u=1}^{U} x(u)$$

wherein U represents a number of the users, and $\tilde{x}$ represents the total high-dimensional transmission signal; broadcasting, by the transmitter, the total high-dimensional transmission signal to all the users by the plurality of channel resources, wherein one of the plurality of channel resources is used to transmit one dimension of the high-dimensional transmission signal; and step 4: receiving, by the $u^{th}$ user, the total high-dimensional transmission signal to obtain a total high-dimensional received signal, and performing matched receiving on the total high-dimensional received signal according to the $u^{th}$ precoding signal to obtain an estimation of a $u^{th}$ original signal, wherein $u=1, 2, \ldots, U$, and a matched receiving process is as follows:

$$\hat{\tilde{x}} = \begin{bmatrix} \hat{\tilde{x}}_1 \\ \hat{\tilde{x}}_2 \\ \vdots \\ \hat{\tilde{x}}_M \end{bmatrix}$$

$$\hat{s}_0(u) = \sum_{i=1}^{M} a_i^*(u)\hat{\tilde{x}}_i$$

wherein $\hat{s}_0(u)$ represents the estimation of the $u^{th}$ original signal, $\alpha_i^*(u)$ represents a conjugation of the $i^{th}$ dimension of the $u^{th}$ precoding signal, $\hat{\tilde{x}}$ represents the total high-dimensional received signal, $\hat{\tilde{x}}_i$ represents an $i^{th}$ dimension of the total high-dimensional signal, and $i=1, 2, \ldots, M$.

2. The high-dimensional non-orthogonal transmission method according to claim 1, wherein in step 2, the $i^{th}$ dimension of the $u^{th}$ precoding signal is as follows:

$$\alpha_i(u) = \prod_{k=1}^{L} \exp\left(\frac{j2\pi(m_k-1)\Delta f_k(u-1)T}{U}\right)$$

then a $u^{th}$ precoded signal is as follows:

$$\alpha(u) = \begin{bmatrix} \alpha_1(u) \\ \alpha_2(u) \\ \vdots \\ \alpha_M(u) \end{bmatrix}$$

wherein j represents an imaginary unit, L represents a number of precoding layers, $m_k$ represents a $k^{th}$ layer of precoding branch indexes, and a number k of the precoding layers and the $k^{th}$ layer of precoding branch indexes m k satisfy:

$$1 \leq m_k \leq M_k$$

$$m_L + \sum_{k=1}^{L-1}\left[(m_k - 1)\prod_{l=k+1}^{L} M_l\right] = i$$

$$\prod_{k=1}^{L} M_k = M$$

wherein $M_k$ represents a number of the $k^{th}$ layer of precoding branches, $\Delta f_k$ represents a $k^{th}$ layer of frequency offset and has a value determined in advance, k=1, 2, . . . L, T represents an offset period and has a value as follows:

$$T = \frac{1}{gcd(\Delta f_1, \Delta f_2, \cdots, \Delta f_L)}$$

wherein $gcd(\Delta f_1, \Delta f_2, \ldots, \Delta f_L)$ represents a greatest common divisor of $\Delta f_1, \Delta f_2, \ldots, \Delta f_L$.

* * * * *